United States Patent [19]
Neff

[11] 3,828,622
[45] Aug. 13, 1974

[54] ELECTRONIC READOUT CONTROL
[76] Inventor: Frederick R. Neff, 2993 Curtis Ave., Des Plaines, Ill. 60018
[22] Filed: Dec. 11, 1972
[21] Appl. No.: 314,112

Related U.S. Application Data
[63] Continuation-in-part of Ser. No. 192,422, Oct. 26, 1971.

[52] U.S. Cl. ............................................. 74/409
[51] Int. Cl. ............................................ F16h 55/18
[58] Field of Search .......................... 74/409, 388 R

[56] References Cited
UNITED STATES PATENTS
3,595,100    7/1971    Stark et al. ........................... 74/409

*Primary Examiner*—Leonard H. Gerin
*Attorney, Agent, or Firm*—Mason, Kolehmainen, Rathburn & Wyss

[57] ABSTRACT

There is provided a numerical readout detector for a machine tool and the like having a movable machine element, the position of which is to be accurately determined. In accordance with the present invention the readout detector includes a rack gear movable in response to the position of the movable machine element and a pinion gear mating therewith. A slight backlash pressure is maintained on the pinion gear to maintain engagement between the pinion gear and rack gear. Adjustable means may be provided for reducing the backlash between the rack gear and the pinion gear substantially to zero.

9 Claims, 15 Drawing Figures

3,828,622
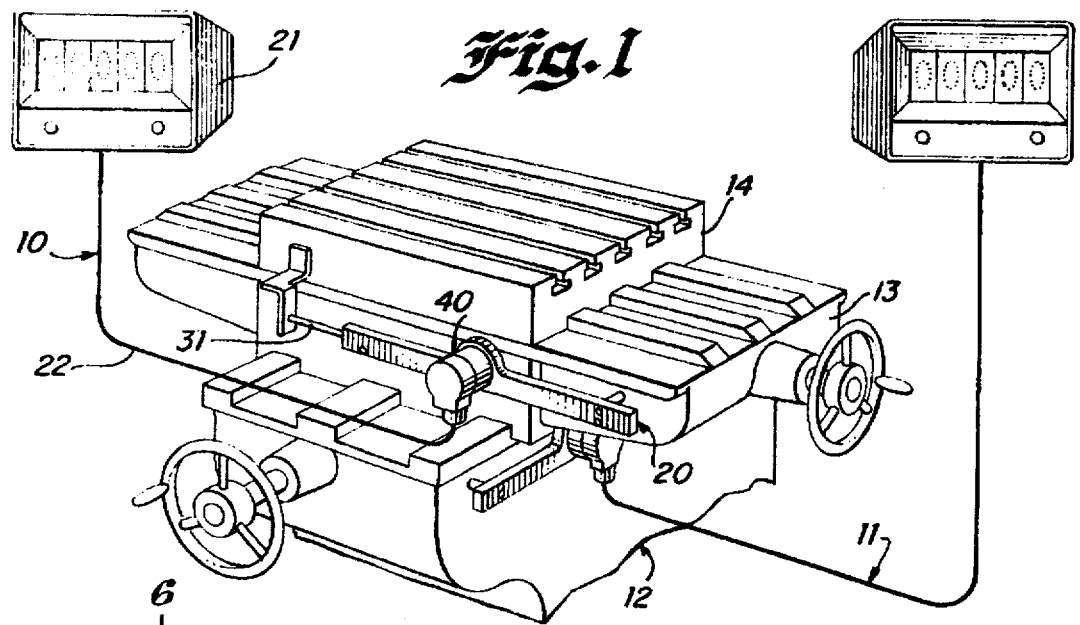
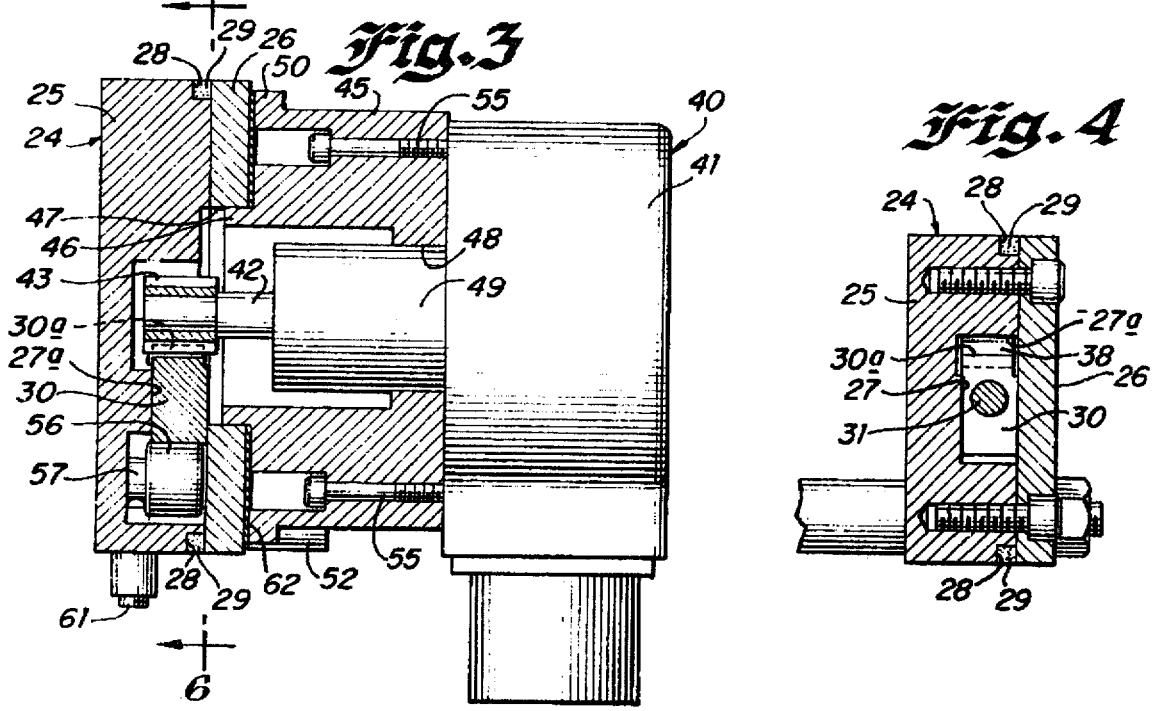
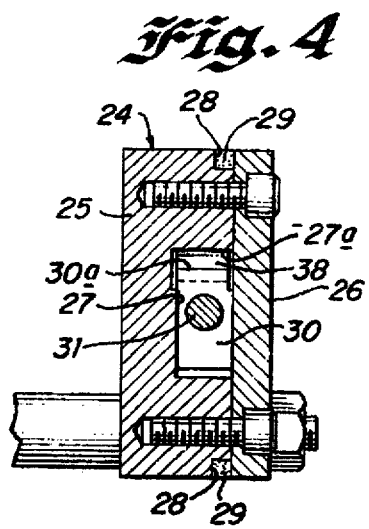
INVENTOR
FREDERICK R. NEFF
BY Mason, Kolehmainen,
Rathburn and Wyss.
ATTORNEYS.

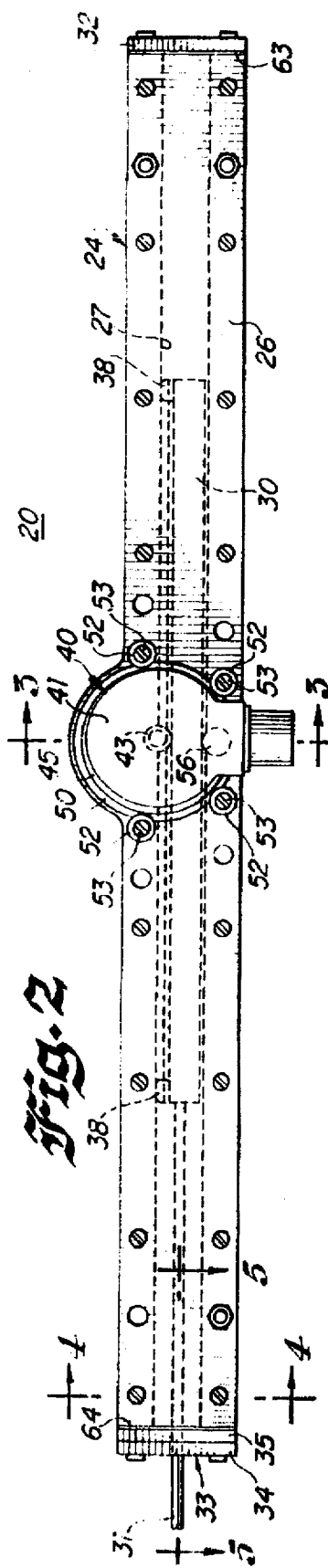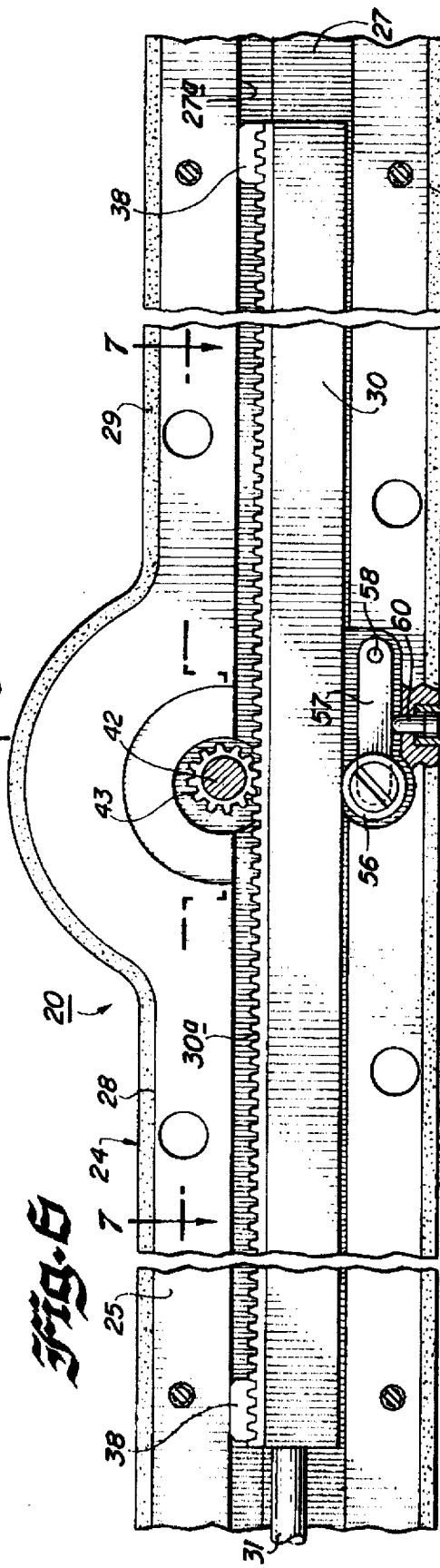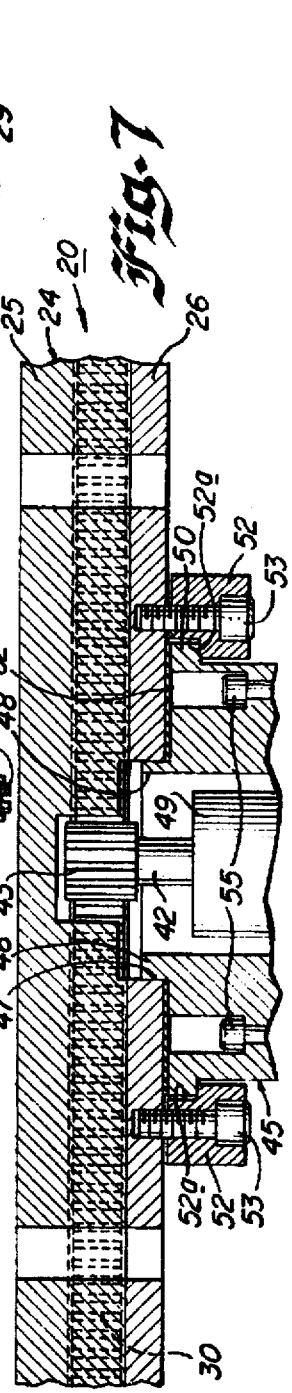
INVENTOR
FREDERICK R. NEFF
BY
Mason, Kolehmainen,
Rathburn and Wyss
ATTORNEYS

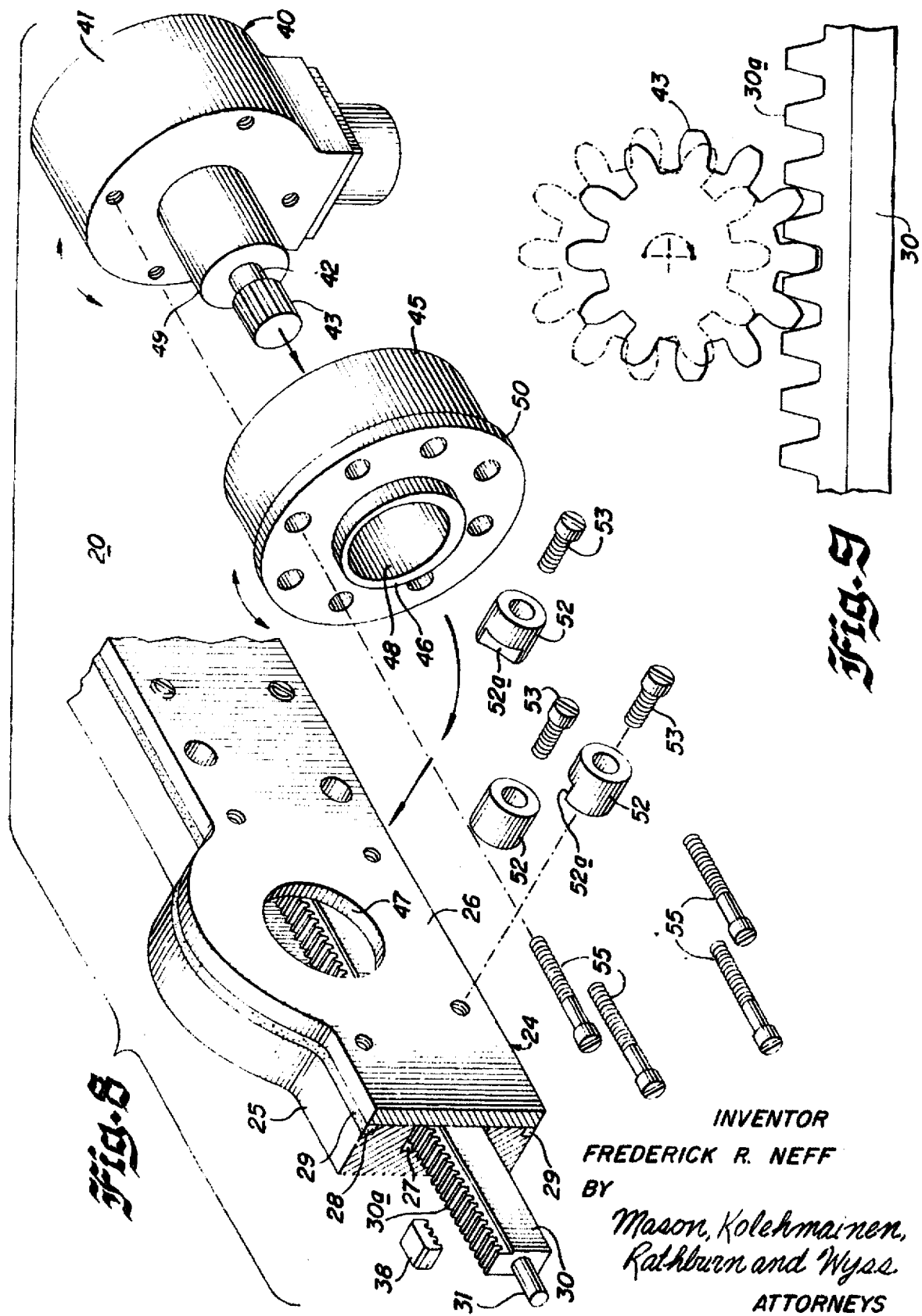

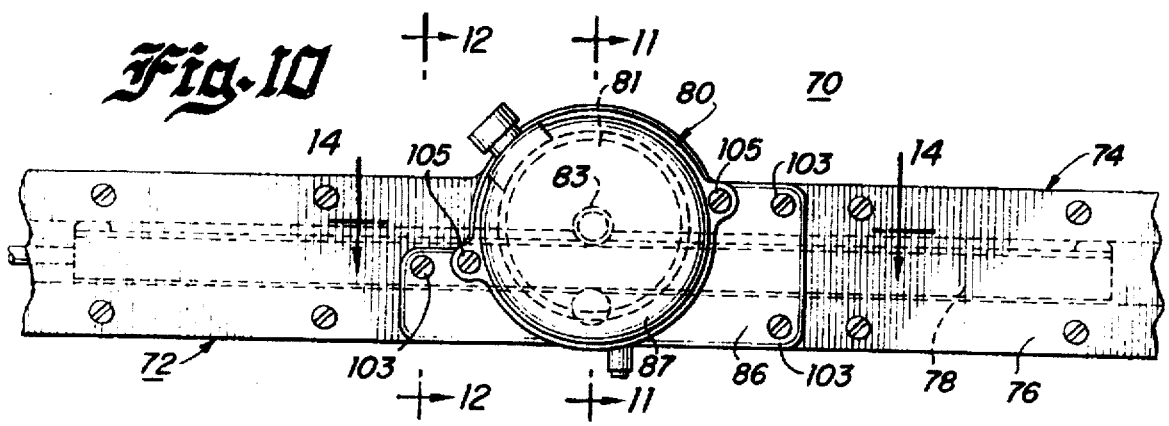
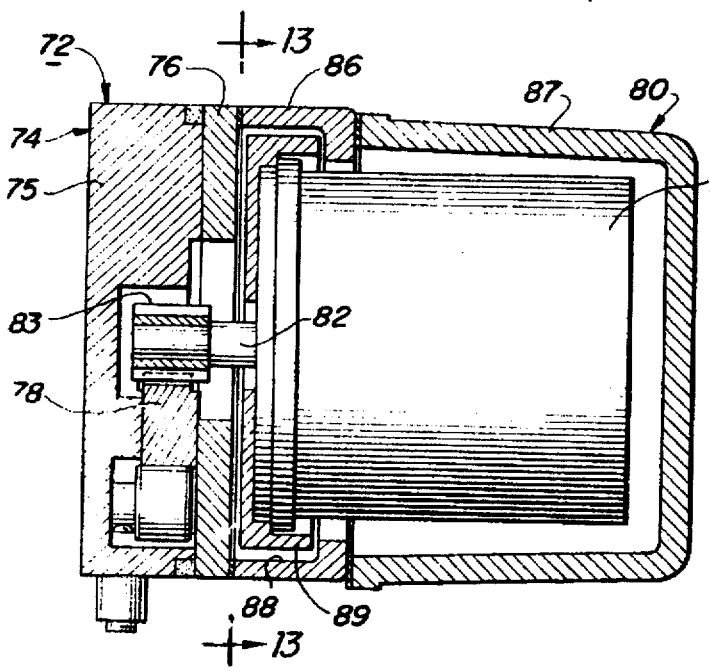
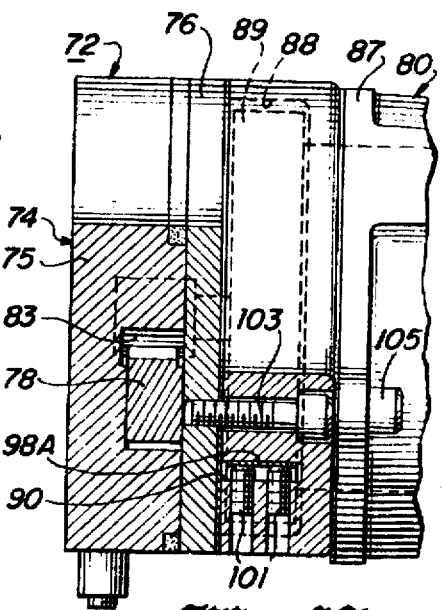
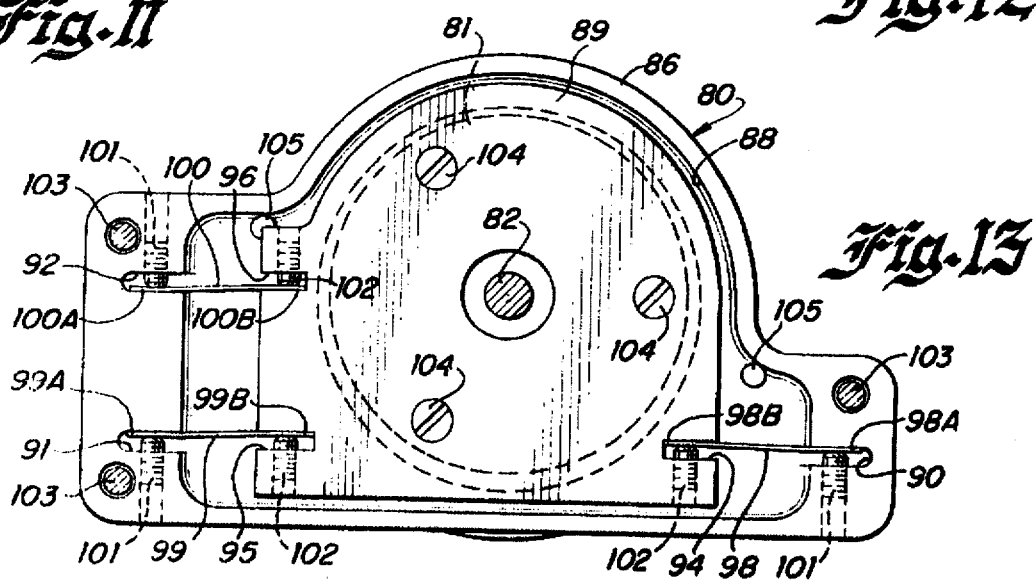

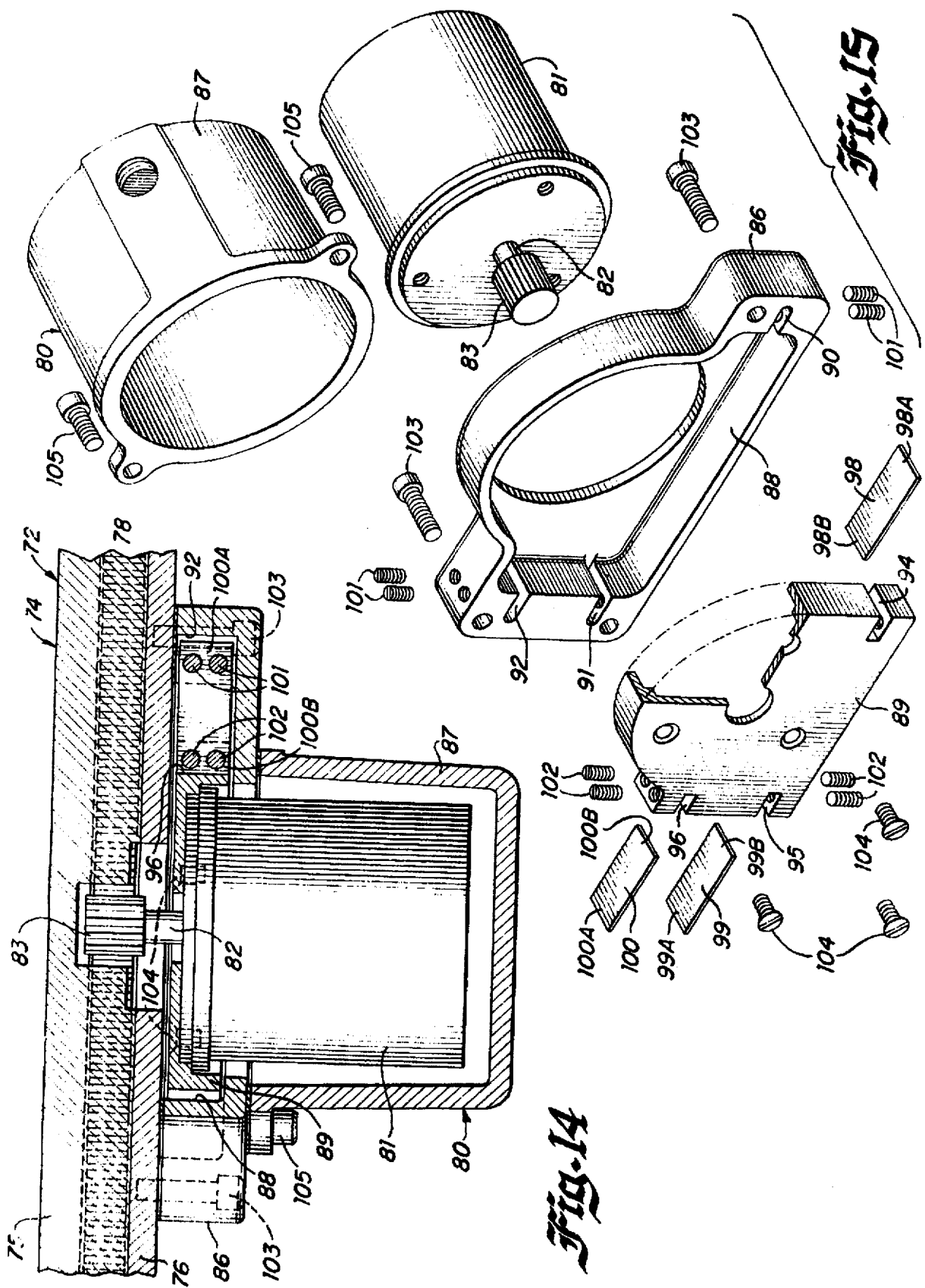

ELECTRONIC READOUT CONTROL

The present invention is a continuation-in-part of my copending application Ser. No. 192,422 filed Oct. 26, 1971.

This invention relates to a numerical readout detector for a machine tool and the like, and particularly to a detector for accurately reading out numerically the position of a movable machine element.

Numerical readout devices are known for use in the machine tool field wherein there is provided a numerical indication of the position of a machine tool element. In the machining industry considerable precision is desired. Heretofore difficulty has frequently been encoundered by backlash or play in the mating readout parts. In order to prevent inaccuracy in the readouts and to prevent distortion and other damage to the sensitive parts of the readout, very light contact or mating pressure must be used; in one commercial embodiment of a numerical readout detector, a backlash pressure in excess of 8 ounces may damage the sensitive detector. Obviously any free play in the gearing will result in erroneous readings therefrom. Moreover moisture, dirt, chips and the like also adversely affect the accuracy of existing devices.

Accordingly it is an object of the present invention to provide a new and improved numerical readout detector which overcomes the above mentioned difficulties.

Another object of the present invention is the provision of a new and improved numerical readout detector.

Still another object of the present invention is the provision of a numerical readout detector which provides a very high degree of accuracy generally unaffected by contamination such as dirt, chips and the like frequently found in machine shop operations.

Yet another object of the present invention is the provision of means for accurately maintaining a slight backpressure between the pinion gear and rack gear of the readout detector.

In accordance with these and other objects of the present invention there is provided a new and improved numerical readout detector for a machine tool and the like having a movable machine element and which provides an accurate numerical reading of the position of the machine element. In accordance with the invention there is provided a gear rack positioned within an enclosed housing and having a positioning member for moving the gear rack in response to the movable element of the machine tool. A numerical readout control is provided for supplying a signal as a function of the position of the rack gear and includes a pinion gear mating with the rack gear. Adjustable means are provided operatively associated with a pinion gear and rack gear providing accurate control of the backlash pressure therebetween. In one embodiment thereof the housing is provided with a circular opening for receiving the numerical readout control, and the adjustable means includes a mounting means having a cylindrical projection extending into the opening, and having an axial bore eccentric to the cylindrical projection and supporting the pinion gear. Rotation of the mounting means relative to the housing moves the pinion gear relative to the rack gear to adjust the backlash therebetween. Moreover to minimize deflection of the rack gear, there is provided a follower roller backing the rack gear transversely of the pinion gear thus eliminating beam deflection of the rack gear.

In another embodiment thereof the numerical readout detector is mounted on reed springs to provide the sensitive backpressure desired between the mating parts.

The invention will be more clearly understood from the foregoing detailed description when read in connection with the accompanying drawings, in which:

FIG. 1 fragmentarily illustrates a numerical readout according to the present invention and secured to a machine tool bed;

FIG. 2 fragmentarily illustrates in plan view a numerical readout detector according to the present invention;

FIG. 3 is a fragmentary sectional view of the numerical readout detector of FIG. 2, taken along line 3—3 of FIG. 2;

FIG. 4 is a fragmentary sectional view of the numerical readout detector of FIG. 2, taken along line 4—4 of FIG. 2;

FIG. 5 is a fragmentary sectional view of the numerical readout detector of FIG. 2, taken along line 5—5 of FIG. 2;

FIG. 6 is a fragmentary sectional view of the numerical readout detector of FIG. 2, taken along line 6—6 of FIG. 2;

FIG. 7 is a fragmentary sectional view of the numerical readout detector of FIG. 2, taken along line 7—7 of FIG. 6;

FIG. 8 is a fragmentary exploded view of the numerical readout detector according to the present invention;

FIG. 9 is a schematic representation illustrating the backlash adjustment of the numerical readout detector according to the present invention;

FIG. 10 fragmentarily illustrated in plan view a numerical readout detector according to another embodiment of the present invention;

FIG. 11 is a fragmentary sectional view of thp numerical readout detector of FIG. 10, taken along line 11—11 of FIG. 10;

FIG. 12 is a fragmentary sectional view of the numerical readout detector of FIG. 10, taken along line 12—12 of FIG. 10;

FIG. 13 is a fragmentary sectional view of the numerical readout detector of FIG. 10, taken along line 13—13 of FIG. 10;

FIG. 14 is a fragmentary sectional view of the numerical readout detector of FIG. 10, taken along line 14—14 of FIG. 10; and FIG. 15 is an exploded perspective view, partly in section, of the numerical readout detector of FIG. 10.

Referring now to the drawings, and particularly to FIG. 1, there is illustrated a pair of numerical readouts 10 and 11 secured to a machine tool fragmentarily illustrated at 12. Each of the numerical readouts 10 and 11 is adapted to give a numerical representation of the position of the tool table, the numerical readout 11 being secured to the frame of the machine tool and being responsive to the transverse position of a movable table 13, while the numerical readout 10 is fastened to the movable table 13 and provides a numeriqal indication of the longitudinal position of the work holding table 14 relative to the movable table 13 and the frame of the machine. It will be understood that the numerical readouts 10 and 11 together provide two dimensional coordinates for the final work holding table 14. Moreover the numerical readouts 10 and 11 are identical, and hereinafter only the numerical readout 10 will be described in detail. Moreover it will be understood that the numerical readouts according to the present invention can be secured to a machine tool to provide a numerical representation of the position of any movable machine element such as a tool head, work holding table or the like.

Referring now to the numerical readout 10, the numerical readout 10 includes a numerical readout detector 20 secured to a visual indicator 21 through a suitable wiring assembly or harness 22. The detector 20 includes an enclosed housing 24 defined by a housing frame 25 and a cover 26. The housing frame 25 is provided with an internal elongated channel 27 extending therethrough, and is further provided along its edges with suitable grooves or recesses 28, FIG. 3, for receiving caulking or sealing compound 29.

A rack gear 30 is slidably received within the channel 27, and suitable positioning means such as a connecting rod 31 interconnects the rack gear 30 and the work holding table 14 as best illustrated in FIG. 1. One end of the channel 27 is closed by an end cap 32, FIG. 2, while the other end is provided with a cap assembly 33, FIGS. 2 and 5, to provide for movement of the connecting rod 31 while maintaining the interior of the housing 24 sealed. More specifically the cap assembly 33 includes a pair of plates 34 and 35 one of which contains an annular groove 36 having a suitable sealing means such as O-ring 37.

The rack gear 30 is very accurately machined, and contains gear teeth 30a along one surface thereof. A pair of bearing blocks 38 are fitted along adjacent end teeth 30a of the rack gear 30 for sliding engagement along a machined bearing surface 27a of the channel 27.

A numerical readout control 40 is secured to the housing 24, as best illustrated in FIGS. 3, 8, and 9. The control 40 includes a head 41 for translating positional rotation of a control shaft 42 into suitable electrical impulses connected through the wiring assembly 22 to the indicator 21. A pinion gear 43 is mounted on the shaft 42 and is in operative engagement with the rack gear 30.

For maximum accuracy between the head 41 and the rack gear 30, it is necessary that the pinion gear 43 and the rack gear 30 have a minimum pressure of backlash or play. For this end there is provided a suitable adjusting means for substantially adjusting the backlash to the desired tolerance. More specifically there is provided a mounting ring 45 secured to the control 40 and adjustably mounting the control to the housing 24. More specifically the mounting ring 45 has a cylindrical projection 46 extending into an opening 47 in the cover 26 of the housing 24, and is further provided with an axial bore 48 eccentric to the cylindrical projection 46 and receiving a journal portion 49 of the control 40. The shaft 42 mounting the pinion gear 43 extends axially from the journal portion 49, through the bore 48 of the mounting ring 45 and through the opening 47. The mounting ring 45 includes a radially extending flange 50, FIGS. 7 and 8 and suitable lock cylinders 52, provided with recesses 52a grip the flange 50 and are secured to the housing 24 by suitable fasteners such as screws 53.

It will be understood that loosening of the screws 53 will permit rotational movement of the mounting ring 45, and due to the eccentricity between the bore 48 and projection 46 the pinion gear 43 will move through an arc toward and away from the rack gear 30 upon rotation of the mounting ring 45, as illustrated between the limits shown in solid and phantom in FIG. 9. In this manner the backlash between the pinion gear 43 and the rack gear 30 can be accurately adjusted to substantially zero tolerance. Moreover as best illustrated in FIG. 8 the mounting ring 45 is fastened to the head 41 by suitable fasteners such as screws 55. The mounting ring 45 may be provided with a multiple of screw openings, as illustrated in FIG. 8, to provide for the selective alignment of the head 41 to a desired angle.

To reduce or eliminate any beam deflection of the rack gear 30, there is provided a follow roller 56 transversely of the pinion gear. Thus bending moment on the rack gear as a result of gear tooth loadings between the pinion gear and the rack gear may be eliminated.

In a preferred embodiment of the invention the follower roller 56 is biased toward the rack gear. Advantageously this is accomplished in the illustrated embodiment by mounting the follower roller on a crank arm 57, pivotally mounted at its opposite end about axis 58 and biased toward the rack gear 30 by a suitable compression spring 59 and plunger 60. A set screw 61 is provided for regulating the bias of the spring 59.

Suitable gaskets 62, 63, and 64 are provided respectfully for the control 40, cap 32, and cap assembly 33 to completely seal the interior of the housing 24.

It will be understood that according to the present invention there is provided an improved numerical readout detector which is unaffected by contamination such as moisture, fluids, dirt, chips and the like normally present in a machine tool operation. Moreover the control of the detector accurately senses the position of a movable machine element to provide an accurate numerical readout of such position.

Referring to the embodiment of FIGS. 10 through 15 there is illustrated a numerical readout 70 according to another embodiment of the present invention. The numerical readout 70 is similar to the numerical readouts 10 and 11 previously described but with a different mode of mounting for the numerical readout control. Thus the numerical readout 70 may be secured to the frame of a machine tool and responsive to the positioning of a tool element. The numerical readout 70 includes a numerical readout detector 71 secured to a visual indicator through a suitable wiring harness or assembly. The detector 72 includes an elongated housing 74 defined by a housing frame 75 and a cover 76. The housing frame includes a rack gear 78 and suitable positioning means such as a connecting rod in like manner as illustrated in the embodiment of FIGS. 1 through 9. A numerical readout control 80 is secured to the housing 74. The control 80 includes a head 81 for translating positional rods of a control shaft 82 into suitable electrical impulses connected through the wiring assembly to the indicator. A pinion gear 83 is mounted on the shaft 82 and is in operative engagement with the rack gear 78.

For maximum accuracy between the head 81 and the rack gear 78, and in view of the very delicate mounting of the control shaft 82, it is necessary that the pinion gear 83 and the rack gear 78 have a light pressure backlash or play. For this end there is provided a resilient mounting for the head 81 of the numerical readout control 80 biasing the pinion gear 83 lightly into engagement with the rack gear 78. More specifically the numerical readout control 80 includes a housing having a base or mounting means 86 and a cup shaped cover 87. The base 86 includes a lower recess 88 receiving a detector mount 89. The base 86 is further provided with a plurality of outwardly extending slots 90, 91, and 92, generally parallel, in the side walls of the lower recess 88 and the detector mount 89 is provided with aligned recesses 94, 95, and 96 confronting the slots 90, 91, and 92. Suitable reed springs 98, 99, and 100 and respective ends extending into confronting slots and recess and mount the detector mount relative to the base. More specifically one end 98A, 99A, and 100A of each reed spring is fixedly secured within one of the slots 90, 91, and 92 by pairs of set screws 101. The other end 98B, 99B, and 100B of each reed spring is fixedly secured within a recess 94, 95, and 96 of the detector mount by pairs of set screws 102. Thus the detector 89 is supported from the base 86 by the reed springs 98, 99 and 100.

The base 86 of the numerical readout control is secured to the cover 76 of the housing 74 by suitable screws 103 and the head 81 of the numerical readout control is secured to the detector mount 89 by suitable screws 104. Thus the head 81 of the numerical readout control is mounted with the pinion gear 83 lightly biased into engagement with the rack gear 78. Since pressures in excess of 8 ounces may be destructive to the head the resilient mounting of the head 81 will provide a zero backlash between the mating pinion gear 78 while limiting the contact pressure to an acceptable load. The cover 87 is secured to the base 86 so as to enclose the head 81 and related components, and may be fastened by means of screws 105.

Although the present invention has been described by reference to several embodiments thereof, it would be apparent that numerous other modifications and embodiments may be devised by those skilled in the art, and it is intended by the appended claims to cover all such modifications and embodiments which fall within the true spirit and scope of the present invention.

What is claimed as new and desired to be secured by Letters Patent of the United States is:

1. A numerical readout detector for a machine tool having a movable machine element and the like including a rack gear;
    positioning means for moving said rack gear in response to said movable machine element;
    a numerical readout control for providing a signal as a function of the position of said rack gear and including a pinion gear mating with said rack gear; and
    pressure means operatively associated with said pinion gear and rack gear providing substantially zero backlash therebetween.

2. A numerical readout detector as set forth in claim 1 and including a sealed housing enclosing said rack gear and pinion gear, said positioning means extending through said housing.

3. A numerical readout detector as set forth in claim 2 wherein said housing is provided with an opening for receiving said pinion gear of said readout control, and wherein said pressure means includes a mounting means for securement to said housing and a detector support means carrying said readout control positioned with said pinion gear in engagement with said rack gear, and biasing means interposed between said mounting means and said detector support means.

4. A numerical readout detector as set forth in claim 3 wherein said biasing means comprises at least one reed spring.

5. A numerical readout detector as set forth in claim 4 wherein said reed spring is fixedly secured at its ends.

6. A numerical readout detector as set forth in claim 5 wherein said housing is provided with a circular opening for receiving said numerical readout control, and wherein said pressure means includes a mounting means having a cylindrical projection extending into said opening, said mounting means having an axial bore eccentric to said cylindrical projection and supporting said pinion gear, whereby rotation of said mounting means relative to said housing moves said pinion gear relative to said rack gear to adjust the backlash therebetween.

7. A numerical readout detector as set forth in claim 6 wherein said housing is provided with an internal elongated channel receiving said rack gear, and further including a follower roller backing said rack gear transversely thereof of said pinion gear eliminating beam deflection of said rack gear.

8. A numerical readout detector as set forth in claim 7 wherein said roller is biased toward said rack gear.

9. A numerical readout detector as set forth in claim 7 wherein one side surface of said channel defines a guide surface, and further including spaced bearing blocks on said rack gear opposed to said roller and sliding on said guide surface.

* * * * *